United States Patent [19]
Moore

[11] 3,730,139
[45] May 1, 1973

[54] CONVERTIBLE BIRD HOUSE & FEEDER

[76] Inventor: Harrington Moore, Hidden Harbor, Stuart, Fla. 33494

[22] Filed: Feb. 9, 1972

[21] Appl. No.: 224,688

[52] U.S. Cl. ................................. 119/23, 119/52 R
[51] Int. Cl. ............................................ A01k 31/00
[58] Field of Search ..................... 119/23, 26, 51 R, 119/52 R

[56] References Cited

UNITED STATES PATENTS

| 1,258,703 | 3/1918 | Perkins | 119/23 |
| 3,115,865 | 12/1963 | Parkes et al. | 119/23 X |

Primary Examiner—Louis G. Mancene
Assistant Examiner—J. N. Eskovitz
Attorney—Gerald Altman et al.

[57] ABSTRACT

A conical shaped housing is provided with an internal partition dividing the housing into two chambers and formed with a central opening at its lower portion. A telescopic feeding tube is mounted to the base of the housing and in its lowered position serves as a perch and feeding station for birds when the housing is filled with seeds. The unit is converted into a bird house by emptying it of bird seed, pushing the feeding tube upwardly to close the partition opening and then removing cover plates from access openings formed in the sides of the housing. A movable lid is provided at the apex of the housing to permit feed to be poured into the housing and cooperates with a cutaway portion of the housing to vent the interior of the unit.

8 Claims, 3 Drawing Figures

Patented May 1, 1973  3,730,139
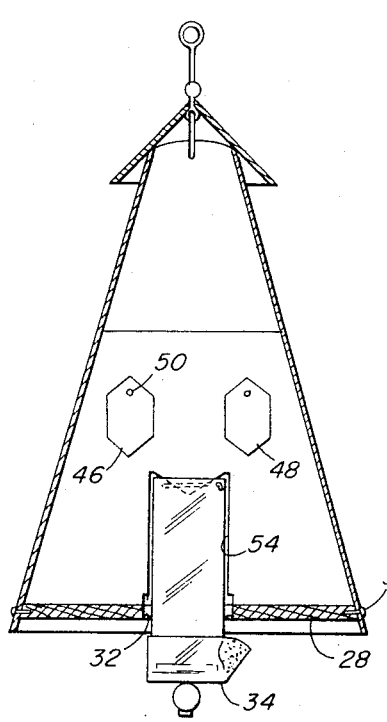
FIG. 2
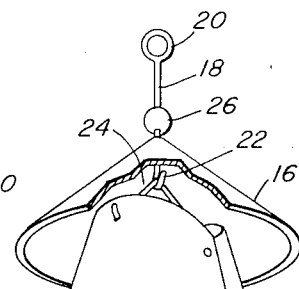
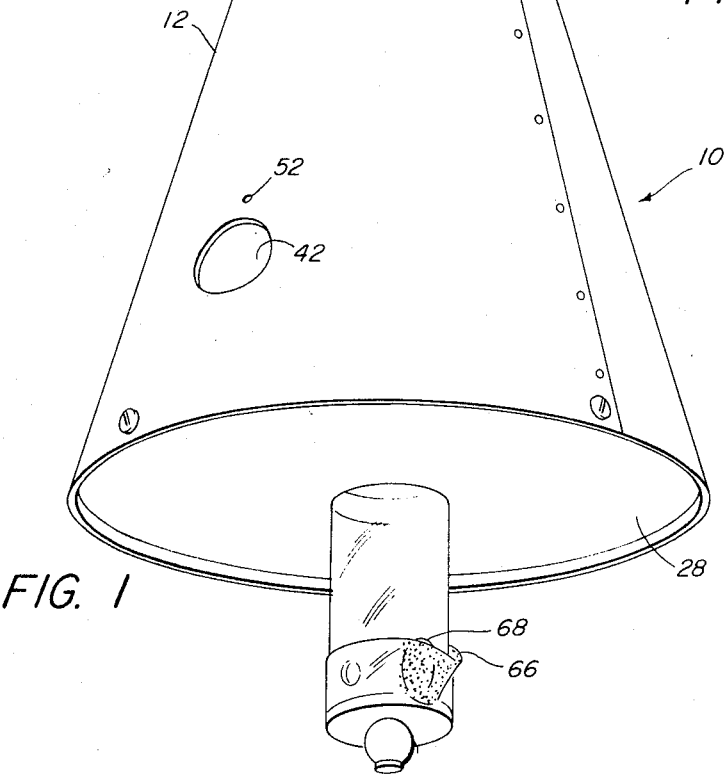
FIG. 3
FIG. 1

3,730,139

CONVERTIBLE BIRD HOUSE & FEEDER

BACKGROUND OF THE INVENTION

1. Field of the Invention

This invention relates generally to bird houses and feeders and more particularly is directed towards a squirrel-proof bird feeding station adjustable to different size seeds and readily convertible to a bird house.

2. Description of the Prior Art

While there have been available many types of bird feeders and bird houses as well as convertible bird houses and feeders, those that have been convertible have lacked simplicity, convenience, durability and a squirrel-proof configuration. Accordingly, it is an object of the present invention to provide a new and improved wild bird station that is quickly and easily convertible from a bird house to a bird feeder and back again and one that is virtually inaccessible to squirrels. A further object of this invention is to provide a bird feeding station that is adapted to accommodate a variety of bird seeds and includes perch adjusting means which is variable according to seed size.

SUMMARY OF THE INVENTION

This invention features a convertible birdhouse and bird feeder comprising a conical housing having an open apex covered by a removable lid through which the housing is filled with seed when used as a feeder and formed with an internal partition extending diametrically across inside of the housing. A bottom wall is detachably connected across the base of the conical housing and carries a telescopic feeding tube adapted to be pulled downwardly when the unit is used as a feeder and pushed upwardly when the unit is converted to a bird house. In the up position, the feeding tube moves up into an opening formed in the partition to divide the housing into two separate chambers. Openings are formed in the sides of the conical housing, one into each side of the partition to provide a double nesting station. The feeding tube is adjustable to accommodate different sizes of seeds.

BRIEF DESCRIPTION OF THE DRAWINGS

FIG. 1 is a view in perspective, partly cut away, of a convertible birdfeeder and bird house made according to the invention, FIG. 2 is a sectional view in side elevation of the unit in a bird house mode, and, FIG. 3 is a view similar to FIG. 2 but rotated 90° and showing the unit in the bird-feeding mode.

DETAILED DESCRIPTION OF THE PREFERRED EMBODIMENT

Referring now to the drawings, the reference character 10 generally indicates a convertible bird house and bird feeder made according to the invention and generally organized about a conical housing 12 preferably fabricated from sheet metal such as aluminum, galvanized steel or the like, to provide a smooth, high peaked structure on which a squirrel cannot gain purchase. The apex of the conical housing 12 is cut away in a somewhat scalloped configuration at 14 whereby a concical-shaped lid 16 serves to cover the open upper end of the housing and yet allow the housing to be vented by virtue of the cutaway portion.

The housing is suspended by means of a wire 18 formed with an eye 20 at its upper end and a hook portion 22 at its lower end engaging a bale 24 the opposite ends of which are hooked onto the upper marginal edges of the housing. A frictional ball 26 is fitted over the wire 18 and typically is provided with a tightly fitting rubber insert to provide a high degree of frictional resistance against displacement. The function of the ball 26 is to prevent the lid from lifting either under the force of wind or a squirrel attempting to get into the feeder. The ball may be forced upwardly to permit the lid to be raised for filling the housing with seeds when used as a feeder.

Across the base of the conical housing 12 is a removable circular bottom wall 28 secured by screws 30 and formed with a central opening 32 to accommodate a telescopic feeding tube 34 mounted for frictional sliding movement therein.

Mounted within the housing, vertically across the center line is a partition 36 extending from the base wall 28 up about two-thirds of the height of the housing and dividing the interior of the housing into two compartments 38 and 40 to provide two separate nesting chambers for birds when the unit is used as a bird house. Each compartment is provided with access openings 42 and 44, respectively, on opposite sides of the conical housing and which are adapted to be closed by detachable cover plates 46 and 48 when the unit is used as a feeder. The cover plates 46 and 48 typically are of sheet metal stock and are mounted in position by inserting the lower end of each cover down into the access opening and securing the upper end of the cover to the housing walls by means of a screw 50 aligned with a screw hole 52 which may have a nut backer. When the unit is in use as a birdhouse, the covers are removed and are conveniently stored within the housing by screwing the same onto the partition 36 using the same screws. The partition is formed with a rectangular opening 54 extending up from the lower edge thereof and slightly wider than the outside diameter of the tubular feeder 34. The function of the opening is to accommodate the feeding tube when in its raised position shown in FIG. 2. When the feeding tube is raised as shown, the opening 54 is closed off by the feeding tube effectively separating the two compartments 38 and 40. With the feeding tube down when the unit is used as a feeder, the opening 54 provides a clear path for the feed to drain down into the feeding tube.

The feeding tube 34 preferably is fabricated of a transparent material such as acrylic plastic or the like whereby the owner may readily observe when the supply of feed in the unit is getting low. The tube 34 is provided with a cross-piece 56 across its upper end to serve as a stop for the tube to prevent it from dropping all the way out of the opening 32. The lower end of the tube 34 is closed by a circular plug 58 cemented in position with an annulus 60 secured by a screw 62 to serve as a stop for a collar 64 rotatably mounted over the outside of the lower end of the tube 34. The collar 34 is formed with an outwardly contoured spout or perch portion 66 on which the birds alight when feeding. The spout or perch portion 66 preferably is covered with sand or the like by means of an epoxy cement or other adhesive and serves not only as a good gripping surface for birds perching thereon but also to act as a repellent to squirrels insofar as squirrels will not normally chew on a sand-covered surface. The outwardly turned perch portion serves to expose one of several circular openings 68 formed in the bottom side walls of the tube 34 and through which the seed in the tube is made accessible to the birds on the perch. The openings 68 are of different sizes and the collar 64 may be rotated about the tube to align the perch portion with any one of the openings according to the size and type of the seed in the housing. Where particularly small seed such as thistle seed is used, a small stone may be placed in the tube to prevent the seed from flowing out too freely.

When the unit is to be used as a birdhouse, the seed is emptied out and, if desired, the base 28 may be removed to clean out the interior of the housing. The cover plates 46 and 48 are removed from the openings 42 and 44 and stored on the partition. When the housing is re-assembled the feeding tube is pushed up to its raised position of FIG. 2 and the unit is in its birdhouse mode. The interior of the housing is fully ventilated not only by the side openings 42 and 44 but also by air passing in through the feeding tube and up through the top of the housing.

The unit is readily converted back into a feeder at the end of the nesting season by again removing the base for cleaning, replacing the cover plates over the openings and lowering the feeding tube. The top may then be raised to fill the unit with seed.

Having thus described the invention what I claim and desire to obtain by Letters Patents of the United States is:

1. A convertible bird house and feeder, comprising
   a. a conical housing formed with at least a pair of access openings in opposite sides thereof,
   b. a circular bottom wall mounted across the base of said housing,
   c. an upright partition mounted within said housing to form at least a pair of compartments therein,
   d. said partition being formed with a recessed opening therein starting at the lower edge thereof and extending upwardly therefrom,
   e. said bottom wall being formed with a central opening in register with said recessed opening,
   f. a tube telescopically mounted in said central opening and adapted to block said recessed opening when in a raised position,
   g. said tube being open at the upper end and closed at the bottom end thereof and formed with at least one seed opening in the side thereof and a perch adjacent thereto.

2. A convertible bird house and feeder according to claim 1 wherein the apex of said housing is open and a conical lid is removably mounted thereover.

3. A convertible bird house and feeder according to claim 2 including an elongated wire extending through the apex of said lid and connected to the upper portion of said housing.

4. A convertible bird house and feeder according to claim 3 including an annular retainer frictionally engaging said wire above said lid.

5. A convertible bird house and feeder according to claim 1 including covers detachably connected to said housing over said access openings.

6. A convertible bird house and feeder according to claim 1 wherein said tube is formed with a plurality of different size seed openings and said perch includes an annular collar portion rotatably and concentrically mounted over said tube, said collar portion being formed with an outwardly extending lip adapted to expose one of said seed openings.

7. A convertible bird house and feeder according to claim 6 wherein said lip is covered with an abrasive grit material.

8. A convertible bird house and feeder according to claim 1 wherein said tube is transparent.

* * * * *